United States Patent [19]

Ugawa et al.

[11] Patent Number: 4,680,892
[45] Date of Patent: Jul. 21, 1987

[54] DEVICE FOR GUIDING UPWARD AND DOWNWARD MOVEMENT OF WINDOW PANE OF AUTOMOTIVE VEHICLE DOOR

[75] Inventors: Satoru Ugawa, Hadano, Japan; Satoshi Obuchi, deceased, late of Fukuoka, Japan, by Fukashi Obuchi, Ruriko Obuchi, legal representatives

[73] Assignee: Nissan Motor Co., Ltd., Yokohama, Japan

[21] Appl. No.: 838,815

[22] Filed: Mar. 12, 1986

[30] Foreign Application Priority Data

Jul. 8, 1985 [JP] Japan .................................. 60-149811

[51] Int. Cl.$^4$ ............................................. E05D 13/00
[52] U.S. Cl. .......................................... 49/374; 49/425
[58] Field of Search ............... 49/374, 375, 425, 414, 49/421, 428, 348

[56] References Cited

U.S. PATENT DOCUMENTS

| | | | |
|---|---|---|---|
| 2,379,923 | 7/1945 | Roethel | 49/375 |
| 2,822,215 | 2/1958 | Blanton et al. | 49/425 |
| 3,466,802 | 9/1969 | Doveinis et al. | 49/374 X |

FOREIGN PATENT DOCUMENTS

| | | | |
|---|---|---|---|
| 7438975 | 11/1974 | France | 49/421 |
| 54-122525 | 8/1979 | Japan . | |
| 58-50275 | 4/1983 | Japan . | |

*Primary Examiner*—Kenneth Downey
*Attorney, Agent, or Firm*—Schwartz, Jeffery, Schwaab, Mack, Blumenthal & Evans

[57] ABSTRACT

An abutment member is mounted on a pair of shafts on which upper and lower rollers are rotatably carried. The abutment member is abuttingly engageable with a wall of a guide rail when both or one of the rollers is caused to move a predetermined amount toward the wall of the guide rail.

11 Claims, 5 Drawing Figures

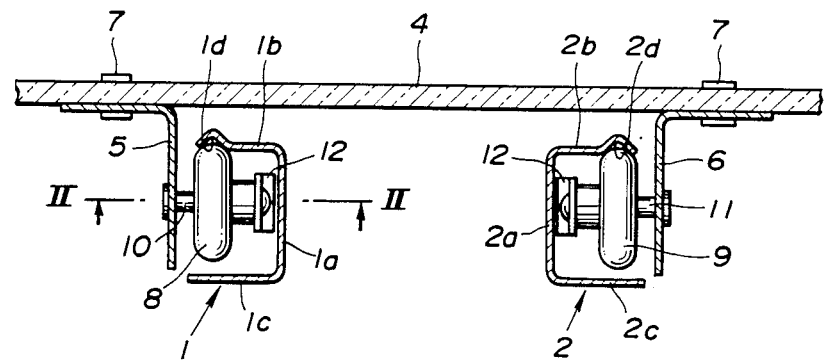
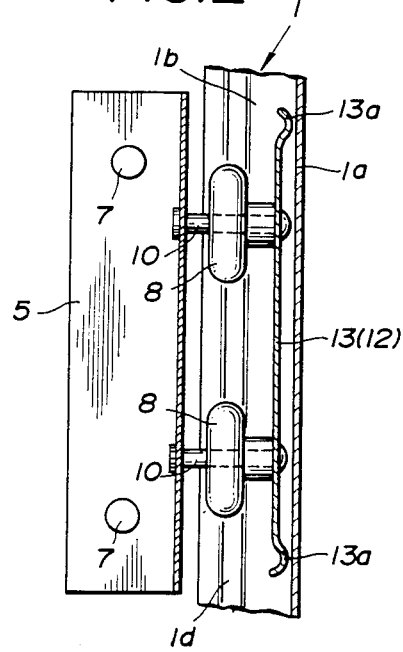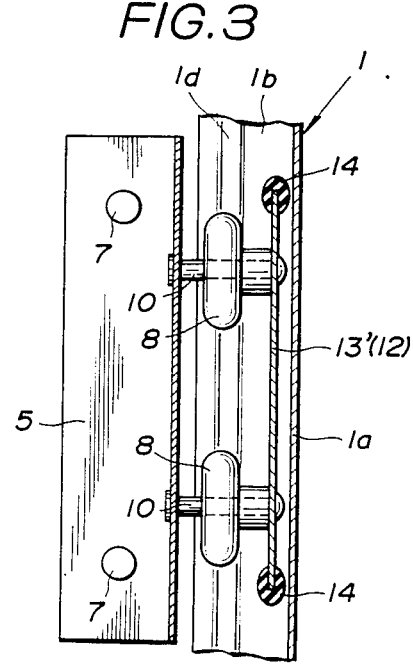

DEVICE FOR GUIDING UPWARD AND DOWNWARD MOVEMENT OF WINDOW PANE OF AUTOMOTIVE VEHICLE DOOR

BACKGROUND OF THE INVENTION

1. Field of the Invention

The present invention relates in general to window regulators for automotive vehicle doors and more particularly to a device for guiding upward and downward movement of a door glass or window pane of an automotive vehicle door.

2. Description of the Prior Art

An example of a prior art device for guiding upward and downward movement of an automotive vehicle door is shown in FIGS. 4 and 5. In the drawings, a pair of forward and rearward guide rails are generally indicated by the reference numerals 1, 2 and disposed within a door main body 3a of an automotive vehicle door 3 to be installed thereon. The guide rails 1, 2 have a U-shaped cross section and each include a pair of parallel side walls 1b, 1c or 2b, 2c and a connecting wall 1a or 2a interconnecting the side walls. The guide rails 1, 2 are arranged so as to be turned at the connecting walls 1a, 2a toward each other. The side walls 1b, 2b located closer to a door glass 4 are respectively formed with V-shaped grooves 1d, 2d. Carrier plates 5, 6 are secured to a lower end portion of the door glass 4 with bolts and nuts 7 and each of which in turn carries thereon by way of shafts 10, 11 a pair of upper and lower guide rollers 8 or 9. The guide rollers 8, 9 are movably engaged with the corresponding guide rails 1, 2 so that the door glass 4 is movable upwardly and downwardly being guided by the guide rails 1, 2. The similar structure as above is disclosed in the Japanese Utility Model Publication No. 58-50275.

A disadvantage of the prior art device is that the door glass 4 can swing forwardly and rearwardly of the vehicle when subjected to a certain force applied thereto from a drive unit of an associated window regulator since the distance between the side walls 1b, 1c or 2b, 2c is designed larger than the diameter of the rollers 8 or 9 so that the rollers 8, 9 are movable smoothly being guided by the side walls. In a particular case, one pair of rollers 8 or 9 can be moved out of the groove 1d or 2d as shown by the two-dot-chain lines in FIG. 5. For the above reason, the prior art device is not highly reliable in operation and liable to be lowered in quality.

SUMMARY OF THE INVENTION

In accordance with the present invention, there is provided a novel and improved device for guiding upward and downward movement of a window pane of an automotive vehicle door. The device comprises a pair of parallel guide rails each of which is U-shaped in cross section and has a pair of parallel side walls and a connecting wall interconnecting the side walls, the guide rails being installed in the door in such a manner as to be turned at the connecting walls toward each other, and a pair roller units movably engaged with the guide rails and movable with the window pane. Each of the roller units including a shaft and a roller rotatably carried on the shaft. The shaft is elongated toward and away from the connecting wall and has an end adjacent the same. The above structure may substantially follow the conventional fashion.

In accordance with the present invention, an abutment member is mounted on the end of the shaft and abuttingly engageable with the connecting wall when the roller is caused to move a predetermined amount toward the connecting wall.

The above structure is quite effective for overcoming the above noted disadvantages and shortcomings inherent in the prior art device.

It is accordingly an object of the present invention to provide a device for guiding upward and downward movement of an automotive vehicle door which can prevent forward and rearward swing of the window pane and assure smooth movement of same.

It is another object of the present invention to provide a window pane guiding device of the above described character which is readily applicable to current window regulators.

It is a further object of the present invention to provide a window pane guiding device of the above described character which as a great practical usefulness though so simple in structure.

BRIEF DESCRIPTION OF THE DRAWINGS

The features and advantages of the window pane guiding device accoding to an embodiment of the present invention will become more clearly appreciated from the following description taken in conjunction with the accompanying drawings, in which:

FIG. 1 is an embodiment of the present invention;

FIG. 2 is a sectional view taken along the line II—II of FIG. 1;

FIG. 3 is a view similar to FIG. 2 but showing a modification of the present invention;

DETAILED DESCRIPTION OF THE PREFERRED EMBODIMENTS

Figure 4:
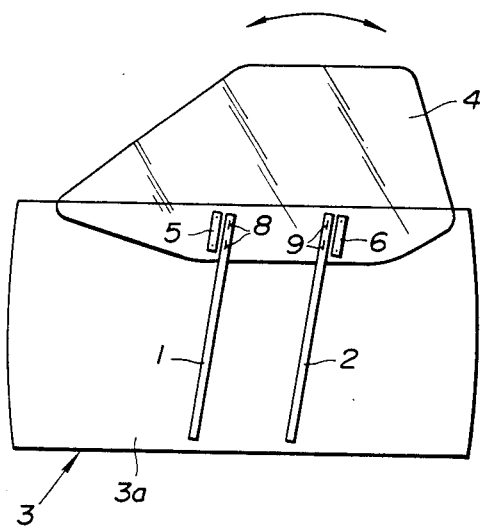
FIG. 4 is a schematic open-up view of a frameless automotive vehicle door provided with a window pane guiding device to which the present invention is applicable.
Figure 5:
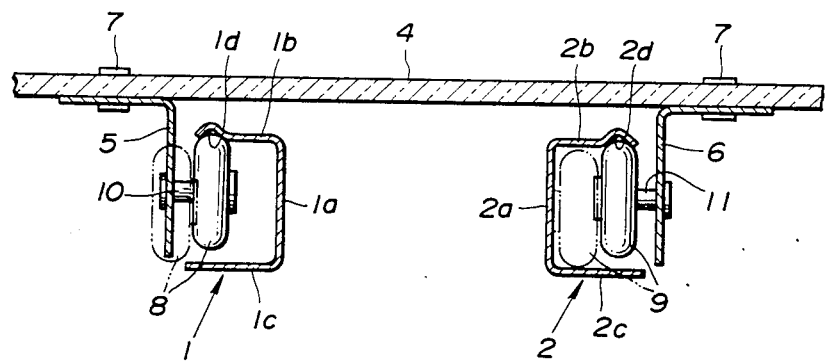
FIG. 5 is a view similar to FIG. 1 but showing a prior art window pane guiding device.

Referring to FIGS. 1 and 2, in which like or corresponding parts to those of the prior art device of FIG. 5 are designated by like reference characters, a pair of parallel forward and rearward guide rails 1, 2 are disposed within a door main body 3a of an automotive vehicle door 3 and installed thereon. One side wall 1b or 2b of each guide rail 1 or 2 is formed with a V-shaped groove 1d or 2d with which a pair of upper and lower rollers 8 or 9 are movably engaged. The pair of rollers 8 or 9 are respectively carried on each pair of shafts 10 or 11 which are parallelly spaced from each other. The shafts 10 or 11 are elongated toward and away from the connecting wall 1a or 2a and have one ends at which they are secured to a carrier plate 5 or 6 and the other ends located adjacent a connecting wall 1a or 2a of the guide rail 1 or 2. The guide rollers 8 or 9 are movably disposed between the groove 1d or 2d and the other side wall 1c or 2c of the guide rail 1 or 2. The rollers 8, 9, shafts 10, 11 and carrier plates 5, 6 constitute a pair of roller units movably engaged with the guide rails 1, 2 and movable with the door glass 4. The above structure is substantially the same as that shown in FIG. 5.

In accordance with the present invention, an abutment member 13 is mounted on the other ends of each pair of shafts 10 or 11 in such a manner as to elongate generally in parallel with the connecting wall 1a or 2a when the rollers 8 or 9 are positioned in place relative to the guide rail 1 or 2. In the embodiment shown in FIGS. 1 and 2, the abutment member 12 is formed as a leaf spring 13 which extends between the shafts 10 or 11 and is secured to same. The leaf spring 13 is long enough to elongate upwardly and downwardly beyond the shafts 10 or 11 and has at the upper and lower ends thereof a pair of semi-circular contacts 13a, 13a at which it is abuttingly engageable with the connecting wall 1a or 2a when caused to move a predetermined amount toward the same. A predetermined clearance is provided between the semi-circular contacts 13a, 13a of the spring 13 and the connecting wall 1a or 2a of the guide rail 1 or 2 when the guide rollers 8 or 9 are located in place relative to the guide rail 1 or 2. In the above, it is to be noted that since the interval between the semi-circular contacts 13a, 13a is larger than that between the shafts 10 or 11, the semi-circular contacts are caused to move toward and away from the connecting wall 1a or 2a a larger distance than the shafts 10 or 11 for a given inclination of the door glass 4.

With the above structure, the door glass 4 is smoothly movable upwardly and downwardly since the distance between the groove 1d or 2d of the guide rails 1 or 2 is larger than the diameter of the rollers 8 or 9. When the door glass 4 is urged to swing forwardly or rearwardly of the vehicle by a certain force applied thereto from a drive unit of an associated window regulator (not shown), one of the leaf springs 13, 13 associated with the corresponding pair of rollers 8 or 9 is caused to abut upon the connecting wall 1a or 2a and resiliently deformed to absorb the above described force, whereby to prevent further movement of the rollers 8 or 9 toward the connecting wall 1a or 2a, i.e., to prevent substantial play of the rollers 8, 9 and therefore forward and rearward swing of the door glass 4. In the above, it is to be noted that since the contacts 13a, 13a at the upper and lower ends of the leaf spring 13 are formed into a semi-circular shape and resiliently deformable and further since normally a clearance is provided between the contacts 13a, 13a and the connecting wall 1a or 2a, smoothness in upward and downward movement of the door glass 4 is not deteriorated at all by the provision of the leaf springs 13, 13. Further, it is to be noted that stability in support of the door glass 4 is increased and forward and rearward swing of the door glass 4 is effectively prevented since the interval between the semi-circular contacts 13a, 13a of the leaf spring 13 is larger than that between the shafts 10 or 11.

FIG. 3 shows a modification of the present invention. In this modification, the upper and lower ends of the leaf spring 13' have secured thereto bulb-shaped synthetic resinous sliding members 14, 14 in place of being formed into the semi-circular shape. This embodiment is superior in prevention of sliding sound to the previous embodiment.

While the abutment member 12 has been described and shown as a spring 13 or 13', it is not limitative but may be modified variously. For example, the support member 12 may be separated into pieces and separately mounted on the shafts 10 or 11.

What is claimed is:

1. A device for guiding upward and downward movement of a window pane of an automotive vehicle door, comprising:

a pair of parallel guide rails each of which is U-shaped in cross-section and has a pair of parallel side walls and a connecting wall interconnecting said side walls, said guide rails being installed in the door in such a manner as to be turned at said connecting walls toward each other;

a pair of roller units movably engaged with said guide rails and movable with the window pane, each of said roller units including a first shaft and a roller rotatably carried on said first shaft, said first shaft being elongated toward and away from said connecting wall and having an end adjacent the same; and an abutment member mounted on said end of said first shaft and disposed to provide a predetermined clearance between said connecting wall and said abutment member, said abutment member being abuttingly engageable with said connecting wall when said roller moves a predetermined amount toward said connecting wall.

2. A device as set forth in claim 1, in which said abutment member comprises a leaf spring.

3. A device as set forth in claim 2, in which said leaf spring comprises an end extending beyond said roller and formed into a semi-circular shape being disposed to provide a predetermined clearance between said connecting wall and said leaf spring end, said leaf spring end being abuttingly engageable with said connecting wall at said semi-circular end.

4. A device as set forth in claim 2, in which said leaf spring comprises an end to which a bulb-shaped synthetic resinous sliding member is secured and is abuttingly engageable with said connecting wall through said sliding member.

5. A device as set forth in claim 1, in which each pair of said roller units comprises a carrier plate secured to the window pane, said first shaft having an end nonadjacent to said connecting wall secured to said carrier plate.

6. A device as set forth in claim 5, in which each pair of said roller units comprises a second shaft spaced parallel to said first shaft and a second roller rotatably carried on said second shaft, said second shaft having an end adjacent siad connecting wall and an end nonadjacent to said connecting wall secured to said carrier plate, said abutment member being mounted on said end of said second shaft and extending beyond said first shaft and said second shaft toward opposite ends thereof.

7. A device as set forth in claim 6, in which said abutment member comprises a leaf spring having said opposite ends formed into a semi-circular shape and being disposed to provide a predetermined clearance between said connecting wall and each of said leaf spring ends, each of said leaf spring ends being abuttingly engageable with said connecting wall at said semi-circular opposite ends.

8. A device as set forth in claim 7, in which said abutment member comprises a leaf spring having said opposite ends to which bulb-shaped synthetic resinous sliding members are secured and abuttingly engageable with said connecting wall through said sliding members.

9. A device as set forth in claim 1, in which at least one of said side walls comprises a groove with which said roller is movably engaged.

10. A device as set forth in claim 9, in which said roller moves a predetermined amount toward said connecting wall when said roller is partially displaced out of said groove.

11. A device as set forth in claim 10, in which said abutment member is resiliently deformed when abuttingly engaged with said connecting wall so as to prevent complete displacement of said roller out of said groove.

* * * * *